Oct. 24, 1961 J. H. BORNZIN 3,005,400
KNOTTER CLEANER FOR HAY BALERS
Filed April 22, 1958 2 Sheets-Sheet 1

Inventor:
James H. Bornzin
Paul O. Pippel
Atty.

Oct. 24, 1961 J. H. BORNZIN 3,005,400
KNOTTER CLEANER FOR HAY BALERS
Filed April 22, 1958 2 Sheets-Sheet 2
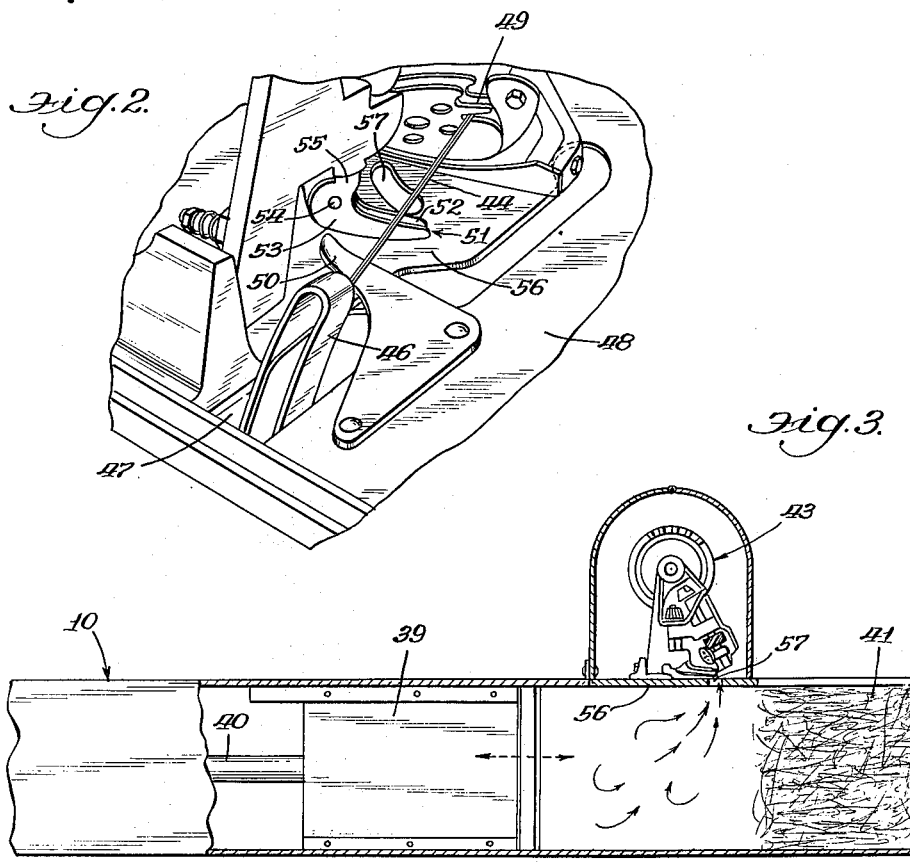
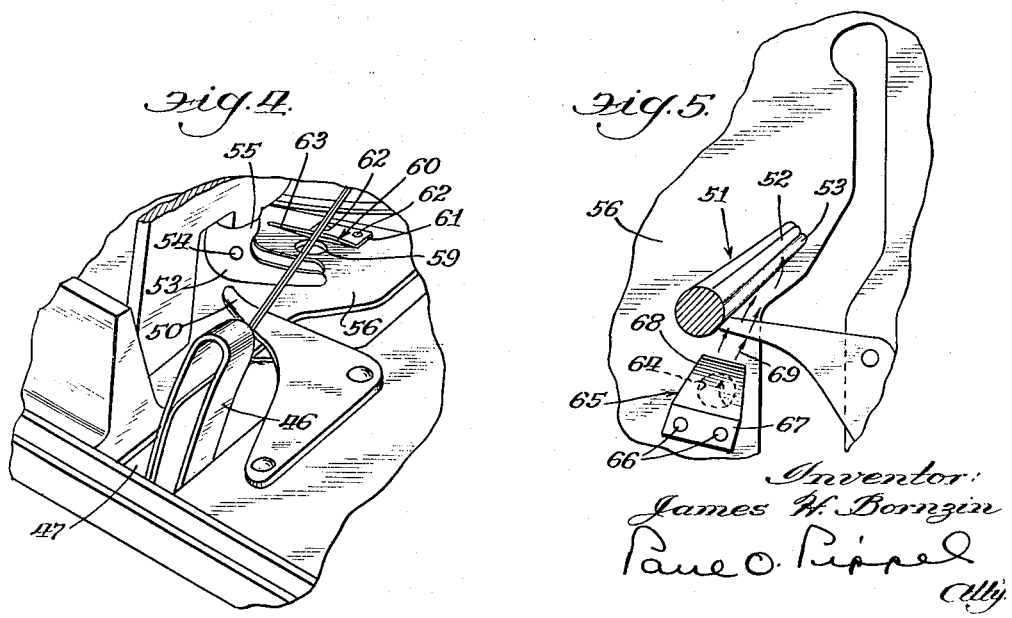
Inventor:
James H. Bornzin
Paul O. Pippel
Atty.

United States Patent Office 3,005,400
Patented Oct. 24, 1961

3,005,400
KNOTTER CLEANER FOR HAY BALERS
James H. Bornzin, La Grange, Ill., assignor to International Harvester Company, Chicago, Ill., a corporation of New Jersey
Filed Apr. 22, 1958, Ser. No. 730,156
1 Claim. (Cl. 100—21)

This invention relates to a new and improved knotter cleaner for hay balers.

In the operation of a present day baler, hay is picked up from a windrow and fed into a bale forming chamber whereupon it is compressed by means of a reciprocating plunger and after sufficient hay has been fed thereto and during this compressed stage the formed bale has a strand or strands of twine or other material passed therearound and by means of mechanical knotters or twisters the strand has its ends tied. In the use of twine, there are knotters associated with the hay baler and these knotters are arranged and constructed to tie a knot in the adjoining ends of twine strand which encircle the formed and compressed bale of hay. The knotter elements among other things include what is known in the industry as a billhook. The billhook has a fixed jaw and a hinged jaw cooperating therewith to pull portions of the twine strand through looped portions and thereupon make a knot therein. The operation of the hinged jaw of the billhook is thus extremely important to the successful mechanical making of a knot. Quite often in baling hay and more particularly dry hay certain portions of the hay become pulverized into powder like material which tends to build up around all of the baling machine and including the knotter elements and its billhook.

It is, therefore, a principal object of the present invention to provide means for maintaining the knotter and billhook of a baler free from trash or other foreign material.

Another important object of this invention is the provision of means in a hay baler having a knotter mechanism for delivering an air blast to maintain the knotter mechanism free of trash or the like.

Still another important object of this invention is to supply a hay baler with a reciprocating plunger and utilizing the movement of the plunger to create a blast of air to maintain the knotter mechanisms clean and free of dust or other trash material.

Another and still further important object of this invention is to provide an aperture in the breast plate of a hay baler closely adjacent the knotter mechanism whereby a reciprocating plunger operating within the bale forming chamber causes a blast of air to be delivered through the aperture at intervals of compression thereby causing the knotter mechanism immediately above the breast plate to be intermittently cleared of trash or other debris or the like.

Another and still further important object of this invention is the provision of a curved elongated slot in the breast plate of a baler having a knotter mechanism immediately thereabove whereby air exhausting from the bale forming chamber upon the reciprocation of a compressing plunger will cause the knotter mechanism to be cleaned.

Still another important object of this invention is to equip a hay baler breast plate with an aperture and a guide shield closely adjacent thereto for directing air passing through said aperture onto said knotter mechanism for cleaning of said knotter mechanism.

Other and further important objects and advantages will become apparent from the disclosures in the following specification and accompanying drawings.

In the drawings:

FIGURE 2 is an enlarged detail perspective view of the knotter cleaning mechanism as employed in the device of FIGURE 1;

FIGURE 3 is a side elevational view of a portion of the device of FIGURES 1 and 2 with portions thereof in section to show the creation of the air blast by the reciprocating plunger;

FIGURE 4 is a perspective view detail of a modified form of the invention; and

FIGURE 5 is a top plan view of a detail of the device as shown in FIGURE 4.

Figure 1:
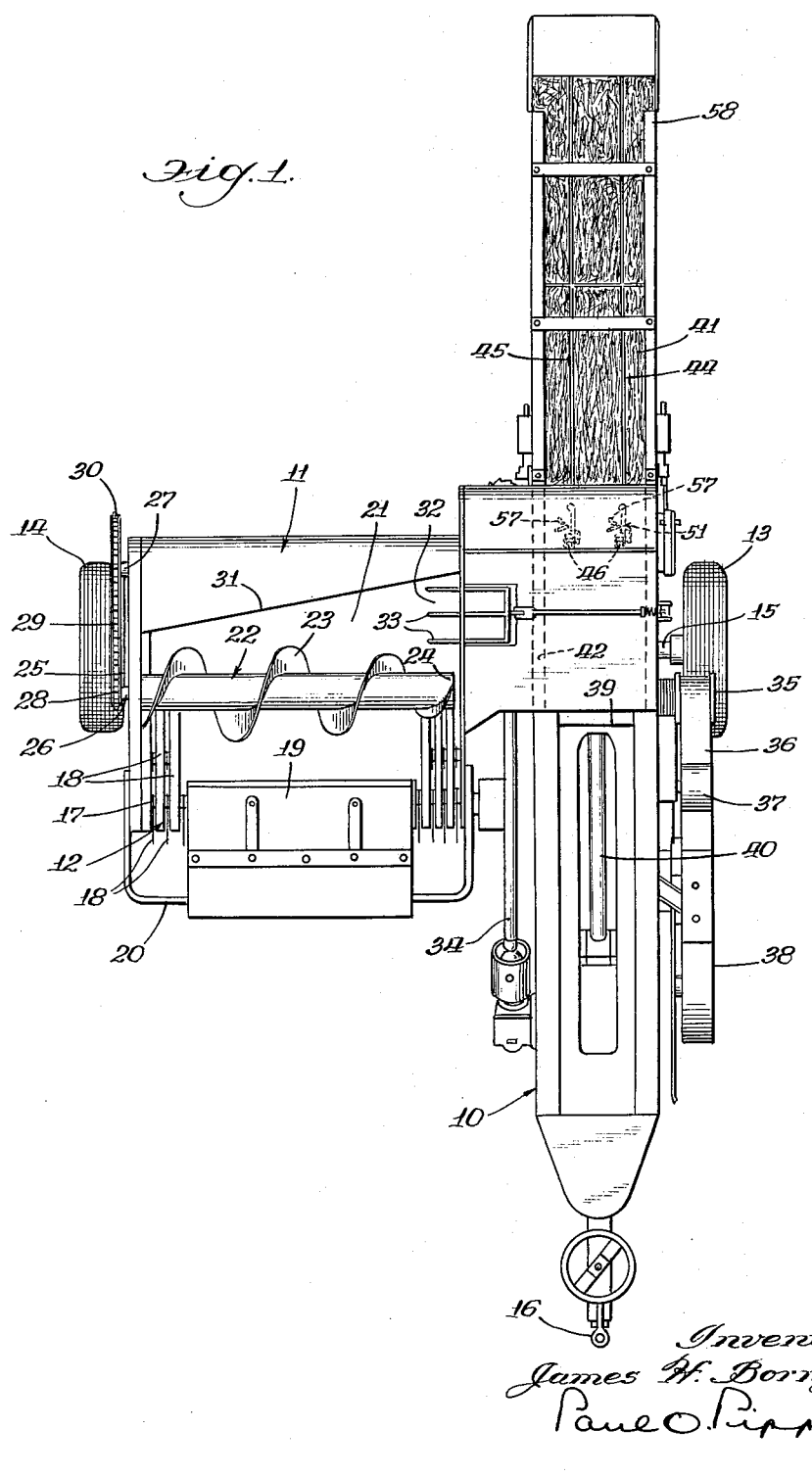
FIGURE 1 is a top plan view of the hay baler incorporating the knotter cleaning mechanism of this invention.

As shown in the drawings, the reference numeral 10 indicates generally an elongated bale forming chamber which constitutes an elongated body portion of the hay baler of this invention. The baler further includes a laterally disposed platform 11 with a pickup mechanism on the forward portion thereof for picking hay up from a windrow and thence delivering it to the elongated longitudinally disposed bale forming chamber 10 for compression into bales. The baler is mounted on a wheel truck including spaced ground engaging wheels 13 and 14 mounted on an axle 15 and extending across substantially the center of the baler. The forward end of the bale forming chamber 10 is provided with a hitch member 16 which is adapted to be fastened to a drawbar of a pulling tractor whereby the hay baler may be pulled through a field to pick up hay for baling. The pickup 12 includes a cylinder 17, spring fingers 18, and spaced leaf member 18. These elements combine to pick up hay from a windrow and carry it up over the top and beneath a crop guiding member 19 which is hinged on a forwardly extending bracket 20 extending around the forward end of the hay receiving platform 11.

The platform 11 has a floor or deck 21 over which a transversely disposed auger 22 having a screw flight 23 is adapted to move material laterally toward the bale forming chamber 10. The inner end 24 of the auger 22 is unjournalled whereas the outer end is carried in an arm 25 as shown at 26. The arm 25 is hingedly mounted on a shaft 27 at the rearward end of the platform 11. A sprocket 28 is mounted on the auger shaft 26 and drive is delivered thereto by means of the chain 29 engaging a sprocket 30 on the shaft 27 which runs across beneath the back wall of the platform 11. An inclined wall or surface 31 is provided along the back of the platform 11 to cooperate with the deck 21 and the auger 22 in moving hay laterally thereacross into the area 32 defined as that area through which packer fingers 33 are adapted to oscillatably travel. The packing fingers 33 are arranged and constructed to sweep hay from the area 32 into and through the side of the bale forming chamber 10 for subsequent compression into bale form.

In the embodiment as shown in the drawings the baler receives its drive from the tractor power take-off and thence delivers it through the forward end of the bale forming chamber 10 where it is carried forwardly by a shaft 34 and thence laterally across bale forming chamber 10 to a pulley 35. A large flat belt 36 is adapted to pass around an idler pulley 37 and a large pulley 38 in the form of a flywheel or the like for imparting drive to the reciprocating plunger 39 shown within the bale forming chamber 10 and having a pitman 40 thereon. Crank mechanism (not shown) converts the rotational drive of the large pulley 38 to the reciprocating motion of the pitman 40.

In the operation of the hay baler of this invention the baler is pulled through a field having hay preferably preliminarily lined up in windrows or the like. The hay is picked up by the cylinder 17 and its spring fingers 18 and moved over the curved leaf members 18 to the deck 21 of the platform 11. Thereupon the hay is fed laterally by the auger 22 through its open unjournalled end 24 into the path of the gyrating packer fingers 33. The hay is then moved into a side opening through the bale forming chamber 10 and the reciprocating plunger 39 causes a compression of the hay into formed bales as shown at 41. Immediately beyond the feed opening 42 the hay passes beneath a knotter mechanism 43 as best shown in FIGURE 3. A tie strand of twine or the like as shown at 44 and another such strand spaced laterally apart at 45 are passed around the formed bales 41 and the ends thereof are tied by the knotter mechanism 43. The knotter mechanism is of a type similar to that shown in the C. F. Crumb Patent 2,405,688 dated August 13, 1946.

As best shown in FIGURE 2, a twine carrying needle 46 brings the strand of twine 44 up through the bale forming chamber 10 and through an elongated opening 47 in the top surface 48 thereof. The needle 46 has carried the twine strand 44 upwardly and rearwardly where it is gripped by a twine holder mechanism 49. Intermediate a twine guiding finger 50 located adjacent the forward portion of the elongated slot 47 and the twine holder mechanism 49 is a knotter billhook 51. The billhook comprises a stationary jaw member 52 and a hinged jaw member 53 cooperating therewith to grip twine in between and to have twine passed thereover as shown in FIGURE 2. The hinge 54 of the billhook 51 is mounted rearwardly on the jaws 52 and 53 and disposed in general alignment with the shank or shaft 55 about which the billhook is arranged to rotate.

The top plate 48 has a portion thereof immediately beneath the billhook 51 further and more specifically identified as a breast plate as shown at 56. The breast plate receives its name from the old binder implements wherein that portion of the knotter beneath the knotter mechanism was called a breast plate upon which the knot was formed. Thus the portion 56 of the top 48 of the bale forming chamber 10 corresponds to and is still referred to as the breast plate.

As stated in the objects above, it is important that the billhook 51 be maintained clear of trash so that its hinged jaw 53 can freely operate relative to the fixed jaw 52. There is a tendency in hay balers for dust and light trash and ground up material from the hay to permeate the air and deposit on any surface in the vicinity. The knotter thus receives its share of dust and leaf material and ground hay, and as previously recited, it is an object of this invention to discharge a blast of air adjacent the knotter and more particularly the billhook so that any such dust is intermittently removed from the billhook thus providing for effective tying of knots throughout all operation of the hay baler.

The breast plate 56 is provided with an arcuate elongated slot 57 beneath the billhook 51. When the reciprocating plunger 39 is moved rearwardly on its compression stroke it causes air to be forced into the direction of the discharge end 58 of the bale forming chamber 10. Obviously the air entrapped in the chamber 10 will tend to escape through any opening in the bale forming chamber and there is thus a discharge of air outwardly from the openings in the surface of the chamber. The elongated arcuately shaped opening 57 in the breast plate 56 which is merely a part of the top 48 of the bale forming chamber 10 is no exception, and hence, as air is discharged in a blast from this opening 57, it is directed onto the billhook 51 located substantially directly thereabove so that the billhook is intermittently cleaned of dust and other foreign matter on each stroke of the plunger 39 thereupon maintaining the billhook clean and ready for knotting operation when sufficient hay has been compiled to constitute a bale. It is thus apparent that in the operation of the device as shown in FIGURES 1, 2 and 3, the reciprocating plunger will without auxiliary mechanism other than the placing of the hole 57 in a general close relationship to the billhook 51 within the breast plate 56 cause an intermittent cleaning of the billhook and thus maintain continued operation free of interference from dust or other foreign matter. The shape of the hole 57 as shown is relatively elongated and somewhat arcuate in shape to cover substantially the elongated shape of the billhook 51 and thereby clean the entire billhook by the blast of air emitting therefrom. Needless to say, the opening 57 may be any shape as desired in order to direct the air coming therethrough against the knotter and/or billhook to thus maintain the knotter and billhook free of dust.

In the modifications of the device as shown in FIGURES 4 and 5 like elements will be given the same numbers. In the device of FIGURE 4 there is included an aperture 59 an an auxiliary deflector or shield element 60 which has a flange 61 lying flush with the breast plate 56 and fastened thereto by rivets or the like 62. An upwardly and forwardly inclined flange 63 of the deflector 60 is positioned substantially over the hole 59 and is for the purpose of directing the air coming through the hole toward the billhook to thus positively insure the guidance of the blast of air toward the billhook and eventual cleaning. The top plan view, as shown in FIGURE 5, shows a modified positioning of the aperture and deflector from that shown in FIGURE 4 and thus new reference numerals will be applied thereto. The aperture is shown at 64 and the deflector 65 is positioned forwardly of the billhook 51. Rivets or other fastening means 66 hold the lower flange 67 thereof flush with the top breast plate 56. The upwardly and angularly bent flange 68 directs a blast of air from the hole 64 rearwardly in the direction of the arrows 69 against the billhook 51 thereby insuring intermittent cleaning of the billhook upon each compression stroke of the plunger.

It will be apparent from an examination of this invention that the invention contemplates the employment of an aperture in a breast plate immediately beneath a knotter and means below the breast plate such as a reciprocating plunger for causing a blast of air to be directed upwardly through the aperture to either directly clean the billhook or by means of deflectors fastened to the breast plate guide the air from the hole toward the billhook and thus clean the hook. It is not contemplated that the aperture must be in any particular position either fore or aft of the billhook when a deflector such as that shown at 60 or 65 is used inasmuch as the blast of air can be directed as desired and necessary to effect a cleaning of that area of the knotter or billhook which may become laden with the dust from the air surrounding the baling operation.

For the purpose of this application the term billhook shall be construed to mean any knotter or twisting hook used in the knotting or twisting of a bale encircling strand.

I am aware that numerous details of construction may be varied throughout a wide range without departing from the principles disclosed herein and I, therefore, do not propose limiting the patent granted hereon otherwise than as necessitated by the appended claim.

What is claimed is:

In a baler comprising a bale forming chamber, a plunger reciprocatively movable within said bale forming chamber, said bale forming chamber having a feed opening therein for the admission of material to be formed into bales, said plunger being arranged and constructed to move past said feed opening, a knotter mechanism mounted externally of said bale forming chamber, a strand carrying needle arranged and constructed to pass across said bale forming chamber and deliver a strand to said knotter mechanism, said bale forming chamber having an opening therein to permit passage of said needle, and said bale forming chamber having an aperture therein separate from the needle opening and located adjacent to and in direct alignment with said knotter mechanism whereby the reciprocative movement of the plunger causes air to be intermittently expelled through said aperture and maintain said knotter mechanism free of foreign matter, said knotter mechanism including a rotating hinged jaw billhook, deflector means mounted exteriorly of said bale forming chamber adjacent said aperture in a manner to direct air coming intermittently through said aperture toward said billhook, said deflector means including an angle bracket having a first flange lying flush with and attached to the surface of said bale forming chamber having the knotter mechanism thereon and having a second flange angled upwardly therefrom to substantially cover said aperture and directed toward said billhook.

References Cited in the file of this patent

UNITED STATES PATENTS

| | | |
|---|---|---|
| 2,413,378 | Raney | Dec. 31, 1946 |
| 2,655,861 | Lizenbee | Oct. 20, 1953 |
| 2,688,284 | Paradise | Sept. 7, 1954 |

FOREIGN PATENTS

| | | |
|---|---|---|
| 1,116,465 | France | May 8, 1956 |